US012411992B2

(12) United States Patent
Royer

(10) Patent No.: US 12,411,992 B2
(45) Date of Patent: Sep. 9, 2025

(54) UPDATING ANNOTATED SOFTWARE OBJECTS

(71) Applicant: JPMorgan Chase Bank, N.A., New York, NY (US)

(72) Inventor: Burk Royer, Conroe, TX (US)

(73) Assignee: JPMORGAN CHASE BANK, N.A., New York, NY (US)

(*) Notice: Subject to any disclaimer, the term of this patent is extended or adjusted under 35 U.S.C. 154(b) by 323 days.

(21) Appl. No.: 18/102,929

(22) Filed: Jan. 30, 2023

(65) Prior Publication Data

US 2024/0256713 A1  Aug. 1, 2024

(51) Int. Cl.
*G06F 21/62* (2013.01)
*G06F 8/30* (2018.01)

(52) U.S. Cl.
CPC .............. *G06F 21/629* (2013.01); *G06F 8/30* (2013.01)

(58) Field of Classification Search
CPC ............. G06F 21/629; G06F 8/30; G06F 8/65
See application file for complete search history.

(56) References Cited

U.S. PATENT DOCUMENTS

| | | | | |
|---|---|---|---|---|
| 2007/0234335 A1* | 10/2007 | Takahashi | ................. | G06F 8/71 717/168 |
| 2010/0100970 A1* | 4/2010 | Roy-Chowdhury | .... | H04L 67/55 726/1 |
| 2011/0307712 A1* | 12/2011 | Sakthikumar | ......... | G06F 21/572 713/189 |
| 2013/0326330 A1* | 12/2013 | Harris | .................. | G06F 40/197 715/234 |
| 2015/0370769 A1* | 12/2015 | Pereira Filho | ........ | G06F 40/166 726/28 |
| 2022/0138161 A1* | 5/2022 | Anjum | .................. | G06F 40/197 715/272 |

* cited by examiner

*Primary Examiner* — Trong H Nguyen
(74) *Attorney, Agent, or Firm* — Greenblum & Bernstein, P.L.C.

(57) ABSTRACT

In one example, a computer program product is disclosed. The computer program product includes instructions, executed by a processor, to parse an original annotated software object for at least one annotation construct. Each annotation construct is to define which attributes of the original annotated software object can be modified and a user role parameter. The instructions include parsing an updated annotated software object of the original annotated software object to use the annotation construct to determine: attribute changes to the original annotated software object and the user role parameter associated with the attribute changes. In the user role parameter is authorized to make the attribute changes, the attribute changes are accepted to store the attribute changes in the updated annotated software object. If the user role parameter is not authorized, the attribute changes are rejected to disallow storage of the attribute changes by the updated annotated software object.

15 Claims, 8 Drawing Sheets

104

301 public class InvestorOrder implements Cacheable, Serializable

{
  private static final long *serialVersionUID* = XXXXXXXXXXXXXXX;
  private int orderId;
  private int dealId;
  private int trancheId;
  private boolean isReconciled = false;

302

303

@DiffCompare(*MARS_SYND_UPDATEABLE_WITHOUT_OVERRIDE* )
  private Long allocatedAmount;
  private Long internalAllocatedAmount;  304

306

303

@DiffCompare({*MARS_SYND_UPDATEABLE_WITHOUT_OVERRIDE, MARS_SALES_UPDATEABLE*})
310  private Region salesDesk;  308

303   305

@DiffCompare({*MARS_SYND_UPDATEABLE_WITHOUT_OVERRIDE, MARS_SALES_UPDATEABLE*})
  private String salesUserName;
312

```
void throwIfMarsOrderChangesNotAllowed(InvestorOrder
originalOrder, InvestorOrder updatedOrder, boolean
isNonSyndicateUpdate) throws
AttributeUpdateNotAllowedException {
  if(updatedOrder.isMarsOrderOverride()) {
    logger.debug("Directbooks order has override flag set: " +
updatedOrder.getOrderId());
    return;
  }
  String diffString = "";
  if(isNonSyndicateUpdate) {
    diffString = DiffUtil.getDiffs(originalOrder, updatedOrder,
MARS_SALES_UPDATEABLE, true);
  } else { diffString = DiffUtil.getDiffs(originalOrder, updatedOrder,

MARS_SYND_UPDATEABLE_WITHOUT_OVERRIDE, true);
  }
  if(!diffString.isEmpty()) {
    String message = "DirectBooks order cannot be updated ";

if(!isNonSyndicateUpdate) {
      message += "unless 'DRBK override' flag is set ";
    }
    message += ": ";
     throw new AttributeUpdateNotAllowedException(message
       + diffString);
  }
}
```

FIG. 4

```
                                                              ┌─ 404
package com.XXXXXXXX.syndicate.util;
import com.XXXXXXXXX.syndicate.domain.interfaces.DiffCompare;
import java.lang.reflect.Field;
....
com.XXXXXXXX.syndicate.domain.interfaces.DiffCompare.DEFAULT;
public class DiffUtil {
....
    public static <T> String getDiffs(T t1, T t2, String compareType) {
        return getDiffs(t1, t2, compareType, false);
    }
...
{
            DiffCompare diffCompare =
field.getAnnotation(DiffCompare.class);
            doCompare = Stream.of(diffCompare.value()).anyMatch(a ->
a.equals(compareType)) != isReverse;
    ...
        return miscompares;
    }
                   ┌─ 512
...
    public DiffResult(String attribute, Object oldValue, Object newValue) {
        this.attribute = attribute; ─ 514
        this.oldValue = oldValue;      ─ 516
        this.newValue = newValue;
    } public static <T> Collection<DiffResult> getDiffsCollection(T t1, T t2) {
        return getDiffsCollection(t1, t2, DEFAULT, false);
    }
...
    ArrayList<DiffResult> miscompares = new ArrayList<>();
...
        return miscompares;
    }
}
```

FIG. 5

UPDATING ANNOTATED SOFTWARE OBJECTS

BACKGROUND

Software developers often use object-oriented programming to build software applications. This object-oriented approach can model real-world objects and their characteristics. As an example, a real-world object such as a bicycle with a state (e.g., color, two wheels, number of gears, etc.) and a behavior (accelerating, changing gears, etc.) can be modeled via object-oriented programming. A software object maintains this state in variables and implements the behavior with methods.

BRIEF DESCRIPTION OF THE DRAWINGS

Examples of the disclosure will be rendered by reference to specific examples which are illustrated in the appended drawings. The drawings illustrate only particular examples of the disclosure and therefore are not to be considered to be limiting of their scope. The principles here are described and explained with additional specificity and detail through the use of the accompanying drawings.

FIG. 3 illustrates a software object data structure with annotation constructs according to examples of the present disclosure.

FIG. 4 illustrates the data structure of an update object utility to call the originalOrder object and the updatedOrder object of FIG. 3 for parsing and comparison according to examples of the present disclosure.

FIG. 5 illustrates a data structure for the parse/compare object utility of FIG. 4 according to an example of the present disclosure.

DETAILED DESCRIPTION

Figure 1:
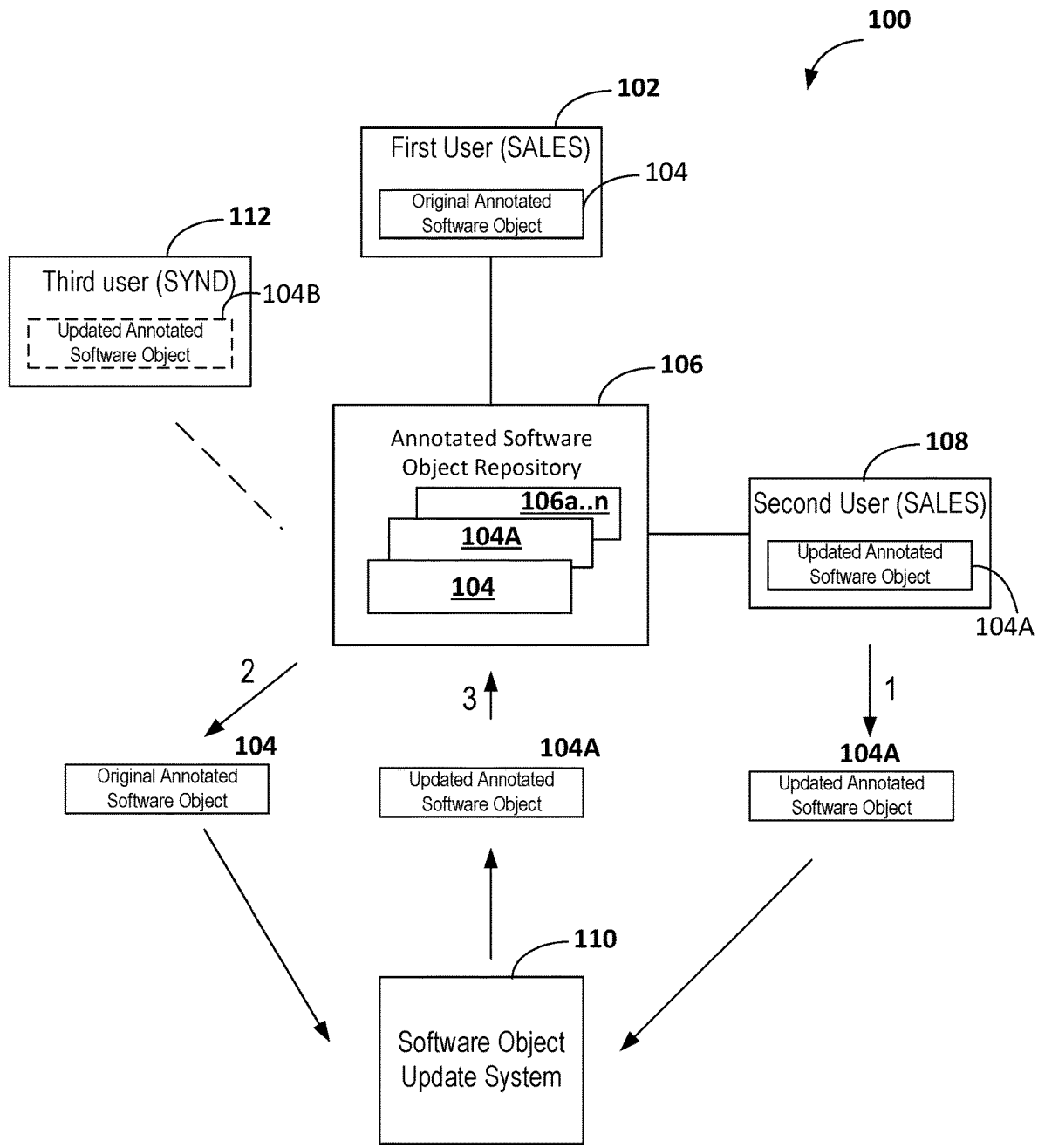
FIG. 1 illustrates a software object update platform according to examples of the present disclosure.

Many software objects maintain their state in variables or attributes. Code changes to attributes that update the software object may be needed from time to time. As an example, code changes that modify the attributes of a Plain Old Java® Object (POJO) may be needed to improve the software object. However, such code changes can quickly become unmanageable and unwieldy, sometimes resulting in very large-sized software objects.

If the software object is the main object in an application, and changes are constantly being made, software developers need to assess the preceding code changes whenever attributes are modified or added. One technique for assessing changes is to write compare methods. However, compare methods would require maintaining an even larger codebase particularly for large classes. Moreover, a compare method would only report that a mis-comparison exists and can return only a Boolean or a true/false value. Changes made by different individuals representing different groups and roles can further complicate this situation as this would require writing multiple compare methods.

The present disclosure addresses the foregoing by providing an object-oriented framework (e.g., Java®) with annotation constructs defining inclusive and/or exclusive attributes within the POJO to compare, with the option of returning verbose results. As used herein, a "verbose" result is a returned String result (or List result) that includes a list of attributes that have "mis-compared" with old and new values.

The present disclosure discloses a system, method and computer product to update annotated software objects. The method may include parsing an original annotated software object for an annotation construct. As will be further discussed below, an annotation construct defines a user role and attributes of a software object that can be modified. Conversely, the annotation construct may define attributes that cannot be modified.

The method of the present disclosure may then parse an updated annotated software object to use the annotation construct to determine attribute changes to the original annotated software object and a corresponding user role parameter. If the user role parameter is authorized to make the attribute changes, the method accepts the attribute changes to store the attribute changes in the updated annotated software object.

And, if the user role parameter is not authorized to make the attribute changes, the method rejects the attribute changes to the original annotated software object to disallow storage of the attribute changes by the updated annotated software object. Further, if the user role parameter is not authorized to make the attribute changes, the method may return a list of attribute changes in string format and/or a map format.

In this manner, attribute code changes don't become unwieldy and unmanageable as such code changes can be authorized/rejected and tracked. Moreover, software developers can avoid larger codebases and need not write compare methods to assess such attribute code changes. The present disclosure goes beyond returning a mis-compare and Boolean true/false values but can return the differences between the mis-compared software objects both in string and map formats. The present disclosure further assigns user roles to different individuals that can make attribute changes thus avoiding the need to write multiple compare methods.

FIG. 1 illustrates a software object update platform 100 according to examples of the present disclosure.

In FIG. 1, software object update platform 100 illustrates three platform users 102, 108, 112, two of the users 102, 108 can update original software objects based on their SALES roles (and annotated attributes), while the third user 112 cannot update software objects based on the user's SYND (syndicate) role.

As used herein, a "role" is a position, function or responsibility assigned to an attribute to either authorize or disallow the modification of the attribute. However, use of a "role" or "user role" is a specific example of a "namespace" or "compare type" for an annotation.

Referring to FIG. 1, software object update platform 100 includes the first user 102 communicably coupled to an annotated software object repository 106 that stores annotated software objects 104, 104A, 106a ... *n*. As used herein, an annotated software object includes one or more lines of software instructions and annotations, comments and the like. The annotated software object may be based on any object-oriented programming language including Java®, C++, PHP, JavaScript®, etc.

As shown, first user 102 stores (via a network interface) an original annotated software object 104 developed by first user 102 in annotated software object repository 106. Here, annotated software object repository 106 can be a single or multiple geographically-dispersed databases. First user 102 may represent a developer or software engineer utilizing a computing device having a processor and corresponding memory. As shown, first user 102 may be part of a SALES team, for example, within a large enterprise.

The second user 108 can retrieve, from annotated software object repository 106, the original annotated software object 104 and other annotated software objects that are stored by first user 102. Second user 108 may represent another developer or software engineer also with a SALES role in the same sales group as first user 102. The second user 108 can retrieve (via a network interface) original annotated software objects to change, update or improve the original annotated software objects.

Both the first user 102 and the second user 108 may further communicate with a software object update system 110. As implied by its name, the software object update system 110 facilitates the updating of original annotated software objects by determining whether such updates are permitted before the updated software object can be stored.

In operation, first user 102 has developed original annotated software object 104 to perform a sales functionality (for example). As will be further discussed, first user 102 includes annotation constructs that designate attributes that can be modified. After building the original annotated software object 104, first user 102 stores the software object in annotated software repository 106. Annotated software repository 106 is generally available to all users of the system.

Second user 108 wishes to update original annotated software object 104 begins by retrieving this original annotated software object 104 from annotated software object repository 106. Upon retrieval, second user 108 makes the desired attribute updates to the original annotated software object 104. The updates may be via a GUI (Graphical User Interface) not shown. In FIG. 1, the updated annotated software object is shown as 104A.

However, updated software objects cannot be stored in annotated software object repository 106 and are not generally available for other users without validation by the software object update system 110 in accordance with the principles and precepts of the present disclosure. Accordingly, as shown by path 1 in FIG. 1, second user 108 forwards updated annotated software object 104A to software object update system 110 for validation. Although illustrated as being external to the user devices, software object update system 110 be local and integrated with the user devices or may be provisioned.

As noted, software object update system 110 receives updated annotated software object 104A. Contemporaneously, as shown via path 2, software object update system 110 retrieves, from the annotated software object repository 106, the original annotated software object 104 previously stored by first user 102. Original annotated software object 104 may include one or more annotation constructs to define which attributes of the original annotated software object 104 can be updated. Software object update system 110 then parses the original annotated software object for the annotation construct(s) which attributes of the original annotated software objects can be modified, and at least one user role parameter.

Software object update system 110 also parses annotated updated annotated software object 104A which includes attribute modifications to original annotated software object 104. Software object update system 110 validates whether the attribute changes in updated annotated software object 104A are permissible based on the annotation constructs of the original annotated software object 104.

In this case, the attribute changes are permissible because both first user 102 and second user 108 both have SALES roles (in this example) and because only attribute changes designated by annotation construct(s) of original annotated software object 104 are made. Accordingly, as shown by path 3 of FIG. 1, the updated annotated software object 104A is stored in annotated software object repository 106 for general use by all users of the update platform 100.

In FIG. 1, in contrast, the third user 112 with a syndicate role (SYND) may not make changes to original annotated software object 104. Users in the syndicate group have not been assigned a role as permissible change makers. Thus, although third user 112 has made attribute changes to original annotated software object 104 shown as original annotated software object 104B, those attribute changes and the updated annotated software object are not stored by annotated software object repository 106. In this manner, software object attribute changes are less complicated because only designated user roles can implement attribute changes to software objects, thus avoiding the need to write multiple or large compare methods that can substantially increase the codebase.

Figure 2:
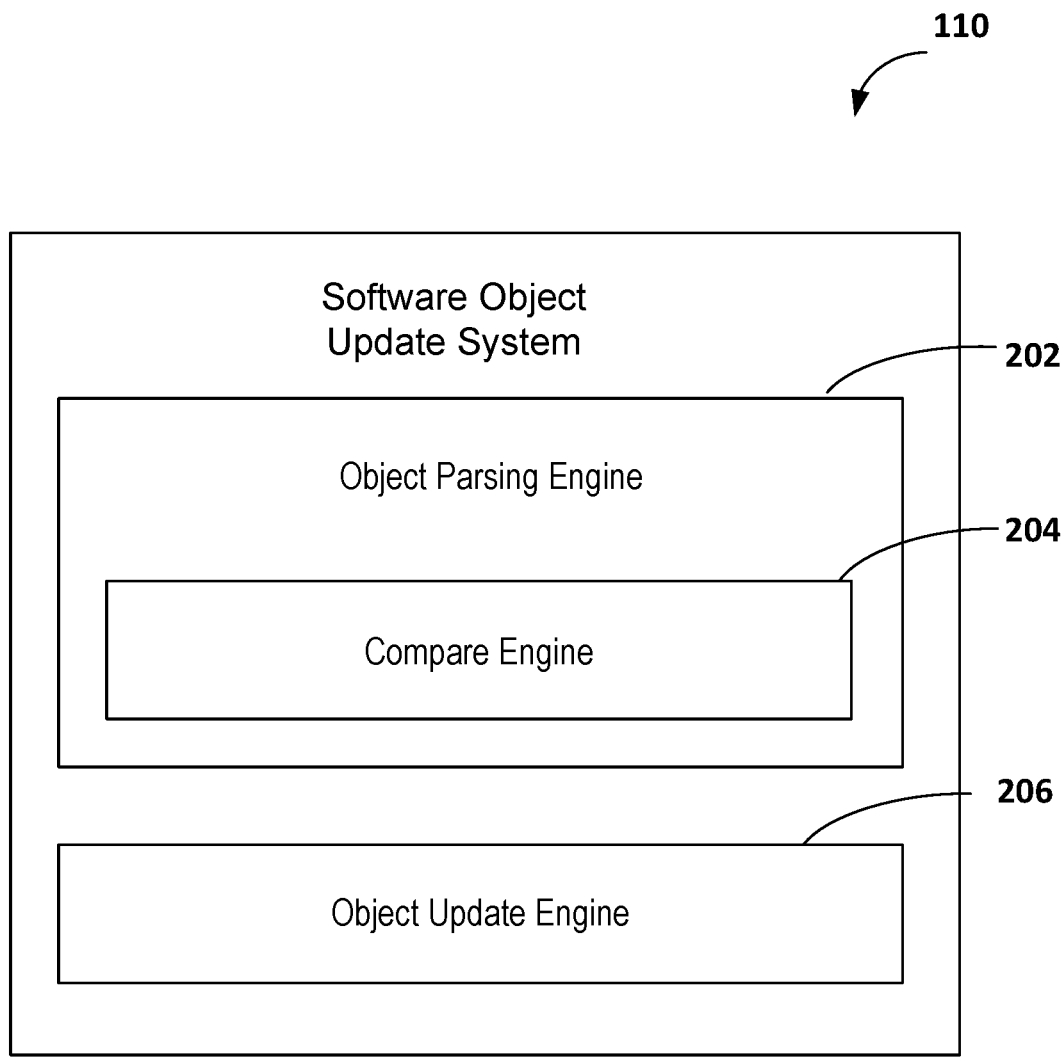
FIG. 2 illustrates components of the software object update system of FIG. 1 according to examples of the present disclosure.

FIG. 2 illustrates components of the software object update system 110 of FIG. 1 according to examples of the present disclosure.

Here, software object update system 110 may include an object parsing engine 202 and an object update engine 206. Object parsing engine 202 may be a program, a routine or instruction that may or may not be part of a compiler to breakup received inputs into constituent parts such as objects, methods and their attributes or options. Object parsing engine 202 may also parse to identify specific code. Object parsing engine 202 may include a compare engine 204 that works in conjunction with object parsing engine 202 to receive original and updated software objects.

Here, object parsing engine 202 and/or compare engine 204 may parse original annotated software object to identify the annotation constructs that designate changeable attributes of the original annotated software object 104 and the user role parameter that can make such changes. Contemporaneously or shortly thereafter, object parsing engine 202 and/or compare engine 204 parses annotated software object 104A to use the annotation constructs to extract attribute changes as well as the user role(s) corresponding to the attribute changes.

The object update engine 206 (like object parsing engine 203) may also be a program, a routine or instruction. Object update engine 206 analyzes the modified attributes and user role(s). If the user role is authorized for attribute changes, object update engine 206 accepts such changes but if unauthorized, the attribute changes are rejected. The attribute changes, if authorized, can then be saved to annotated software object repository 106.

FIG. 3 illustrates an example of the data structure of original annotated software object 104 (FIG. 1) with annotation constructs according to the present disclosure. In this example, although the original annotated software object 104 has been illustrated with a JAVA® object, the present disclosure is applicable to other object-oriented programming languages.

Specifically, in FIG. 3, original annotated software object 104 is an InvestorOrder object 301 that includes various annotation constructs 302, 306, 310. Each annotation construct 302, 306, 310 is to provide supplemental information about the software object. Here, the supplement information may indicate the modifiable attributes of the software object and the user role that can make such attribute modifications. As shown, each one of the annotation constructs 302, 306, 310 begins with @ and do not change the action of a compiled program.

The InvestorOrder object 301 is passed to a parse/compare utility 400 (FIG. 4) that reads the annotation constructs 302, 306, 310 to obtain the modifiable attributes and the designated user role(s) for comparison with changed attributes of an updated software object. In another example, the user role may be passed as a variable.

As shown in FIG. 3, annotation construct 302 is:
  @DiffCompare (MARS_SYND_UPDATEABLE_WITHOUT_OVERRIDE) which has attributes 304:
  private Long allocatedAmount;
  private Long internalAllocatedAmount.

The user role or enumeration that can make subsequent changes is MARS_SYND_UPDATEABLE_WITHOUT_OVERRIDE 303, and this user role can only change attributes 304, i.e., allocatedAmount and internalAllocatedAmount stored by annotation construct 302. If user role MARS_SYND_UPDATEABLE_WITHOUT_OVERRIDE 303 makes changes other than to attributes 304, the changes would be rejected by software object update system 110, and object update engine 204 (FIG. 2).

The reverse is also true. If a different user role other than user role MARS_SYND_UPDATEABLE_WITHOUT_OVERRIDE 303 makes changes to attributes 304, such changes are rejected by software object update system 110.

In FIG. 3, annotation construct 306 is also shown as:
  @DiffCompare({MARS_SYND_UPDATEABLE_WITHOUT_OVERRIDE, MARS_SALES_UPDATEABLE}) which lists a single attribute 308:
  private Region salesDesk.

The user roles that can make changes to attribute salesDesk 308 are MARS_SYND_UPDATEABLE_WITHOUT_OVERRIDE 303 and MARS_SALES_UPDATEABLE 305. These two users can only change the listed attribute salesDesk 308. If user roles MARS_SYND_UPDATEABLE_WITHOUT_OVERRIDE 303 and MARS_SALES_UPDATEABLE 305 make changes to attributes other than salesDesk 308, the changes would be rejected by software object update system 110.

As a further example, annotation construct 310 is
  @DiffCompare({MARS_SYND_UPDATEABLE_WITHOUT_OVERRIDE, MARS_SALES_UPDATEABLE}) having a single attribute 312:
  private String salesUserName.

The user roles that can make changes to attribute salesUserName 312 are MARS_SYND_UPDATEABLE_WITHOUT_OVERRIDE 303 and MARS_SALES_UPDATEABLE 305. These two user roles can only change the listed attribute salesUserName 312. If the user roles MARS_SYND_UPDATEABLE_WITHOUT_OVERRIDE 303 and MARS_SALES_UPDATEABLE 305 make changes to attributes other than salesUserName 312, the changes would be rejected by software object update system 110.

As can be seen in FIG. 3, user roles are defined in the annotation constructs for each attribute data type. For example, the attribute salesUserName 312 corresponds to a string data type. For this string type, the roles are MARS_SYND_UPDATEABLE_WITHOUT_OVERRIDE 303 and MARS_SALES_UPDATEABLE 305, while for the attribute salesDesk 308 with a region data type, the same roles (MARS_SYND_UPDATEABLE_WITHOUT_OVERRIDE 303 and MARS_SALES_UPDATEABLE 305) are defined.

In operation, a user wishing to authorize or prevent unauthorized changes, inserts annotation constructs 302, 306, 310 into original annotated software object 104, along with the applicable user role(s) e.g., MARS_SYND_UPDATEABLE_WITHOUT_OVERRIDE 303. A user then passes the original annotated software object and updated annotated software object for parsing/comparison, to determine whether the attribute updates are authorized.

FIG. 4 illustrates the data structure of an update object utility 400 to call originalOrder object 301 and the updatedOrder 402 of the InvestorOrder for parsing and comparison according to examples of the present disclosure.

Specifically, as an example, the statement 406 in FIG. 4:
  diffString=DiffUtil.getDiffs(originalOrder, updatedOrder, MARS_SALES_UPDATEABLE, true)
passes originalOrder object 301 and updatedOrder 402 via a parse/compare object utility 404 or method DiffUtil.getDiffs further described with reference to FIG. 5. In this specific use case, when the sales role attempts to make an update, "isNonSyndicateUpdate" 401 is passed to the method "throwIfMarsOrderChangesNotAllowed" 403 as true; for the syndicate role, it's passed as false. Thus, parse/compare object utility 404 (method DiffUtil.getDiffs) uses MARS_SALES_UPDATEABLE DiffCompare annotated attributes for comparison when it's true, and the MARS_SYND_UPDATEABLE_WITHOUT_OVERRIDE DiffCompare annotated attributed when it's false. DiffUtil.getDiffs then parses the objects, and returns differences based on the role MARS_SALES_UPDATEABLE 305.

FIG. 5 illustrates an abbreviated data structure for parse/compare object utility 404 of FIG. 4 according to an example of the present disclosure.

In FIG. 5, parse/compare object utility 404 (DiffUtil) is called by update object utility 400 of FIG. 4. Parse/compare object utility 404 parses originalOrder object 301 (see FIG. 4) and updatedOrder 402 (FIG. 4) and the returns the attribute changes between them. In FIG. 5, as shown, DiffResult 512 returns oldValue 514 of the original attribute defined by the annotated construct and a newValue 516 of the attribute as modified in the updated annotated software object. In one example implementation, parse/compare object utility 404 may use a software language introspector that can examine itself and/or manipulate internal properties of a program. A more detailed version of the parse/compare object utility is shown in the Appendix below.

Figure 6:
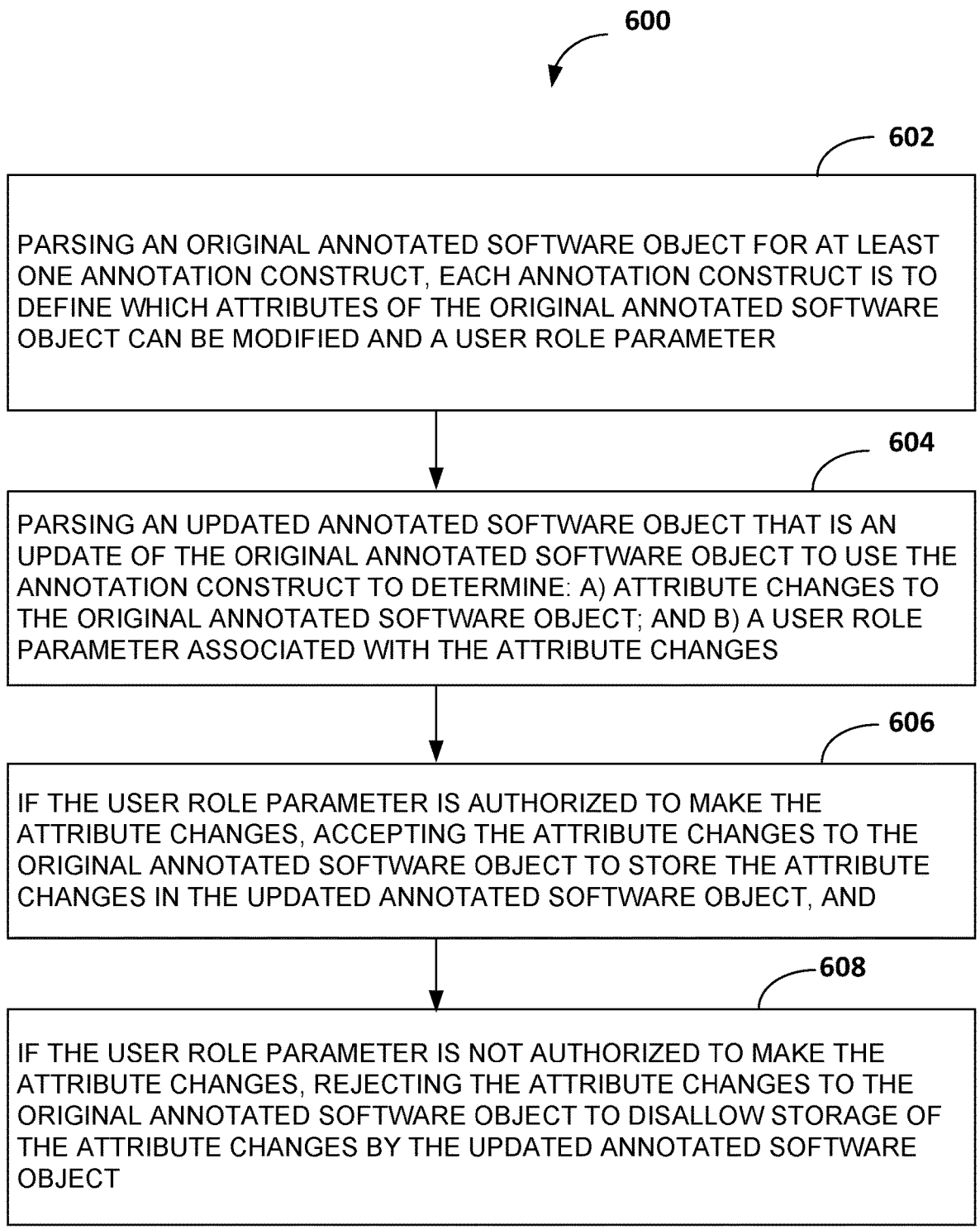
FIG. 6 illustrates a method of updating annotated software objects according to an example of the present disclosure.

FIG. 6 illustrates a method 600 of updating annotated software objects according to an example of the present disclosure.

At block 602, method 600 involves parsing original annotated software object 104 for at least one annotation construct (e.g. 302, FIG. 3). For some examples, each annotation construct 302 may define which attributes (e.g. 304, FIG. 3) of original annotated software object 104 can be modified, and at least one user role parameter (e.g., 305, FIG. 3).

At block 604, method 600 involves parsing updated annotated software object 104A. Here, updated annotated software object 104A is parsed to use the annotation construct 302 to determine: a) attribute changes to original annotated software object 104; and b) the user role parameter 305 associated with the attribute changes.

At block 606, method 600 involves, if the user role parameter 305 is authorized to make the attribute changes, accepting the attribute changes to the original annotated software object 104 to store the attribute changes in the updated annotated software object 104A.

At block 608, if the user role parameter 305 is not authorized to make the attribute changes, rejecting the attribute changes to the original annotated software object 104 to disallow storage of the attribute changes by the updated annotated software object 104A.

Although not shown, method 600 may involve returning a list of attribute changes in a string format and a list of attribute changes in map format if the user role parameter 305 is not authorized to make the attribute changes.

Figure 7A:
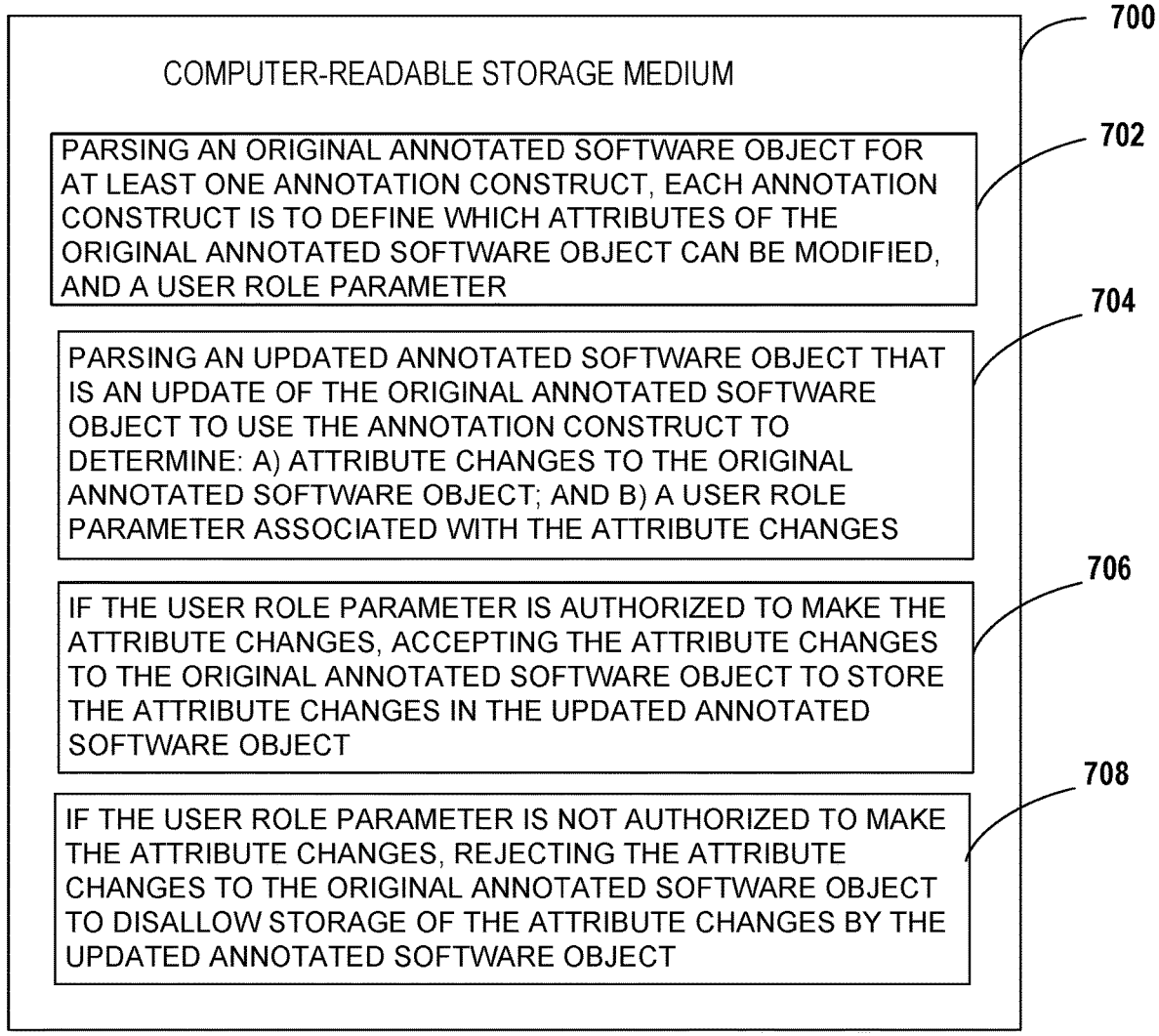
FIG. 7A illustrates example instructions stored on a non-transitory computer-readable storage medium according to one example of the present disclosure.
Figure 7B:
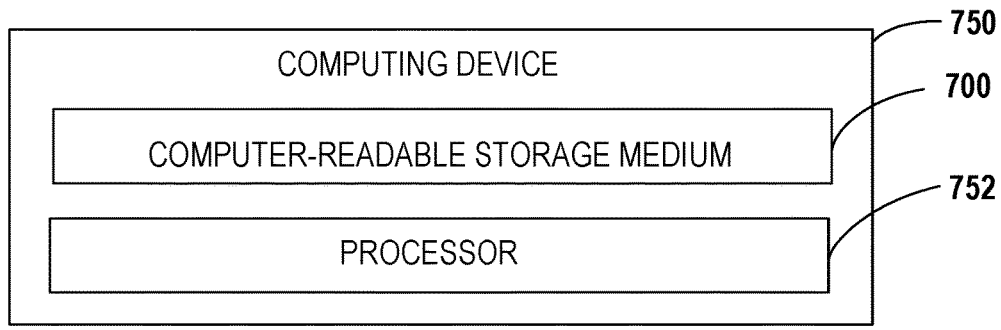
FIG. 7B illustrates an example computing device according to an example of the present disclosure.

FIG. 7A illustrates example instructions stored on a non-transitory computer-readable storage medium 700 for updating annotated software objects according to one example of the present disclosure, and FIG. 7B illustrates an example computing device 750 according to the present disclosure.

As shown in FIG. 7A, the non-transitory computer-readable storage medium 700 includes instruction 702, instruction 704, instruction 706 and instruction 708.

Instruction 702 may cause a processor 752 to parse an original annotated software object 104 for at least one annotation construct, each annotation construct is to define which attributes of the original annotated software object can be modified and a user role parameter.

Instruction 704 may cause a processor 752 to parse an updated annotated software object 104A that is an update of the original annotated software object 104 to use the annotation construct to determine: a) attribute changes to the original annotated software object; and b) a user role parameter associated with the attribute changes.

Instruction 706 may cause a processor 752 to, if the user role parameter is authorized to make the attribute changes, accept the attribute changes to the original annotated software object 104 to store the attribute changes in the updated annotated software object 104B.

Instruction 708 may cause a processor 752 to, if the user role parameter is not authorized to make the attribute changes, reject the attribute changes to the original annotated software 104 object to disallow storage of the attribute changes by the updated annotated software object 104B.

The non-transitory computer-readable storage medium 700 may be any electronic, magnetic, optical, or other physical storage device that stores executable instructions. For example, the non-transitory computer-readable storage medium 700 may be random access memory (RAM), an electrically-erasable programmable read-only memory (EEPROM), a storage drive, an optical disc, or the like. The non-transitory computer-readable storage medium 700 can be encoded to store executable instructions that cause the processor 752 to perform operations according to examples of the disclosure.

Figure 8:
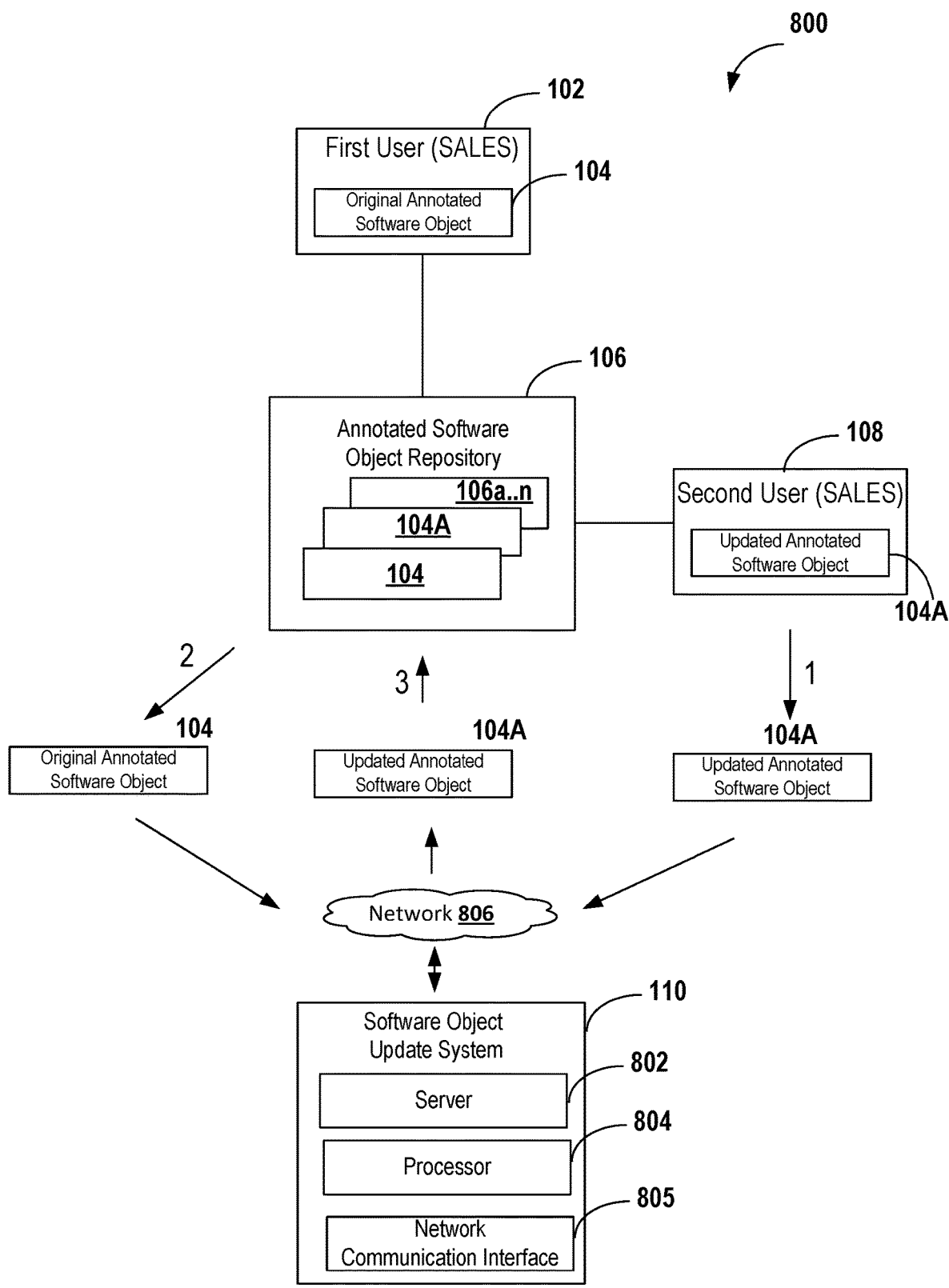
FIG. 8 illustrates a software object update platform according to an example of the present invention.

FIG. 8 illustrates a software object update platform 800 according to an example of the present invention. FIG. 8 includes the same components and operates as described with reference to software object update platform 100 of FIG. 1 except that software object update platform 800 includes a network 806, and the software object update system 110 includes a server 802, a processor 804 and a network communication interface 805. Software object update system 110 communicates with the remainder of software object update platform 800 via network communication interface 805 and network 806. Server 802, for example, may cause processor 804 to parse, over network 806 via the network communication interface 805, the original annotated software object 104.

The present disclosure may employ a software stack to enlist the underlying tools, frameworks, and libraries used to build and run example applications of the present disclosure. Such a software stack may include PHP, React, Cassandra™, Hadoop®, Swift®, etc. The software stack may include both frontend and backend technologies including programming languages, web frameworks servers, and operating systems. The frontend may include JavaScript®, HTML, CSS, and UI frameworks and libraries. In one example, a MEAN (MongoDB®, Express.js, AngularJS, and Node.js) stack may be employed. In another example, a LAMP (Linux®, Apache®, MySQL®, and PHP) stack may be utilized.

While particular examples have been described, various modifications, changes and substitutions are intended in the foregoing disclosures, and it will be appreciated that in some instances some features of particular examples will be employed without a corresponding use of other features without departing from the scope and spirit as set forth. Therefore, many modifications may be made to adapt a particular situation or material to the essential scope and spirit.

For example, a third role with different attributes that can changed by the third role may be added. As another example, additional attributes and the DiffCompare annotations for the attributes can be added to the object for parsing. DiffUtil can use the attributes and associated annotations in the code. Further, other implementations of the present disclosure are possible. For example, the present disclosure may compare numerous objects across two different batch runs; using annotations to exclude any attributes (such as an update time stamp) that are expected to change.

Any suitable programming language can be used to implement the routines of particular examples including Python®, C, C++, Java®, JavaScript®, assembly language, etc. Different programming techniques can be employed such as procedural or object oriented. The routines may execute on specialized processors.

The specialized processor may include memory to store a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a software program.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

While the above is a complete description of specific examples of the disclosure, additional examples are also possible. Thus, the above description should not be taken as limiting the scope of the disclosure, which is defined by the appended claims along with their full scope of equivalents.

APPENDIX

```
package com.XXXXXXXX.syndicate.util;
import com.XXXXXXXX.syndicate.domain.interfaces.DiffCompare;
import java.lang.reflect.Field;
import java.util.*;
import java.util.stream.Stream;
import static com.XXXXXXXX.syndicate.domain.interfaces.DiffCompare.DEFAULT;
public class DiffUtil {
    public static <T> String getDiffs(T t1, T t2) {
        return getDiffs(t1, t2, DEFAULT, false);
    }
    public static <T> String getDiffs(T t1, T 2, String compareType) {
        return getDiffs(t1, t2, compareType, false);
    }
    public static <T> String getDiffs(T t1, T t2, String compareType, boolean isReverse) {
        if(t1 == null && t2 == null) return "";
        if(t1 == null && t2 != null) return "null/non-null";
        if(t1 != null && t2 == null) return "non-null/null";
        String miscompares = "";
        for (Field field : t1.getClass( ).getDeclaredFields( )) {
            field.setAccessible(true);
            boolean doCompare = isReverse;
            if (field.isAnnotationPresent(DiffCompare.class)) {
                DiffCompare diffCompare = field.getAnnotation(DiffCompare.class);
                doCompare = Stream.of(diffCompare.value( )).anyMatch(a -> a.equals(compareType)) != isReverse;
            }
            if(doCompare) {
                try {
                    Object o1 = field.get(t1);
                    Object o2 = field.get(t2);
                    if (!o1.equals(o2)) {
                        if (!miscompares.isEmpty( )) {
                            miscompares += ",";
                        }
                        miscompares += field.getName( ) + "=[" + o1 + "]/[" + o2 + "]";
                    }
                } catch (Exception e) {
                }
            }
        }
        return miscompares;
    }
    public static class DiffResult {
        private final String attribute;
        private final Object oldValue;
        private final Object newValue;
        public DiffResult(String attribute, Object oldValue, Object newValue) {
            this.attribute = attribute;
            this.oldValue = oldValue;
            this.newValue = newValue;
        }
        public String getAttribute( ) {
            return attribute;
        }
        public Object getOldValue( ) {
            return oldValue;
        }
        public Object getNewValue( ) {
            return newValue;
        }
    }
    public static <T> Collection<DiffResult> getDiffsCollction(T t1, T t2) {
        return getDiffsCollection(t1, t2, DEFAULT, false);
    }
    public static <T> Collection<DiffResult> getDiffsCollection(T t1, T t2, String compareType) {
        return getDiffsCollection(t1, t2, compareType, false);
    }
    public static <T> Collection<DiffResult> getDiffsCollection(T t1, T t2, String compareType, boolean isReverse) {
        if(t1 == null && t2 == null) return Collections.EMPTY_LIST;
        if(t1 == null && t2 != null) return Collections.singleton(new DiffResult(t1.getClass( ).getSimpleName( ),"null", "non-null"));
        if(t1 != null && t2 == null) return Collections.singleton(new DiffResult(t1.getClass( ).getSimpleName( ),"non-null", "null"));
        ArrayList<DiffResult> miscompares = new ArrayList<>( );
        for (Field field : t1.getClass( ).getDeclaredFields( )) {
            field.setAccessible(true);
            boolean doCompare = isReverse;
```

APPENDIX-continued

```
      if (field.isAnnotationPresent(DiffCompare.class)) {
          DiffCompare diffCompare = field.getAnnotation(DiffCompare.class);
          doCompare = Stream.of(diffCompare.value( )).anyMatch(a ->
a.equals(compareType)) != isReverse;
      }
      if(doCompare) {
        try {
          Object o1 = field.get(t1);
          Object o2 = field.get(t2);
          if (!o1.equals(o2)) {
              miscompares.add(new DiffResult(field.getName( ), o1, o2));
          }
        } catch (Exception e) {
        }
      }
    }
  }
  return miscompares;
  }
}
DiffCompare Annotation Interface class
com.XXXXXXXXXX.syndicate.domain.interfaces;
import java.lang.annotation.ElementType;
import java.lang.annotation.Retention;
import java.lang.annotation.RetentionPolicy;
import java.lang.annotation.Target;
@Retention(RetentionPolicy.RUNTIME)
@Target(ElementType.FIELD)
public @interface DiffCompare {
  String DEFAULT = "DEFAULT";
  String[ ] value( ) default {DEFAULT};
}
```

The invention claimed is:

1. A computer program stored on a non-transitory, computer-readable storage medium having instructions, which when executed by a processor is to perform the following operations:
constructing electronically an original annotated software object within a software object update system comprising an object parsing program engine and an object updating program engine;
executing the object parsing program engine that electronically parses for a specific software code in the original annotated software object associated with at least one annotation construct, wherein each of the at least one annotation construct is to define which attributes of the original annotated software object can be modified and at least one user role parameter comprising a no override parameter designation authorized to implement modifications of the original annotated software object;
executing the object updating program engine that electronically parses an updated annotated software object, which is an update of the original annotated software object, based on the at least one annotation construct involving:
a) attribute changes to the original annotated software object; and
b) the at least one user role parameter associated with the attribute changes;
responsive to the at least one user role parameter being authorized to make the attribute changes, accepting the attribute changes to the original annotated software object to store the attribute changes in the updated annotated software object, and
responsive to the at least one user role parameter not being authorized to make the attribute changes, rejecting the attribute changes to the original annotated software object to disallow storage of the attribute changes by the updated annotated software object; and
executing a software language introspection program as part of the object parsing program engine that self-examines and manipulates internal program properties of the object parsing program engine.

2. The computer program of claim 1, when the at least one user role parameter is not authorized to make the attribute changes, returning a list of attribute changes in a string format.

3. The computer program of claim 1 when the at least one user role parameter is not authorized to make the attribute changes, returning a list of attribute changes in a map format.

4. The computer program of claim 1, wherein the attribute changes are to a subset of attributes of the original annotated software component defined by the at least one annotation construct.

5. The computer program of claim 1, wherein the at least one annotation construct defines attributes that cannot be modified.

6. A server system comprising:
a network communication interface;
a non-transitory storage medium with instructions; and
a processor to execute the instructions to:
construct electronically an original annotated software object within a software object update system comprising an object parsing program engine and an object updating program engine;
execute the object parsing program engine, over a network via the network communication interface, that electronically parses for a specific software code in the original annotated software object for at least one annotation construct, wherein each of the at least one annotation construct is to define which attributes of the original annotated software object can be modified and at least one user role parameter comprising a no override parameter designation authorized to implement modifications of the original annotated software object;

executing the object updating program engine that electronically parses an updated annotated software object, which is an update of the original annotated software object based on the at least one annotation construct involving:
a) attribute changes to the original annotated software object; and
b) the at least one user role parameter associated with the attribute changes;
responsive to the at least one user role parameter being authorized to make the attribute changes, accept the attribute changes to the original annotated software object to store the attribute changes in the updated annotated software object; and
responsive to the at least one user role parameter not being authorized to make the attribute changes, reject the attribute changes to the original annotated software object to disallow storage of the attribute changes by the updated annotated software object; and
execute a software language introspection program as part of the object parsing program engine that self-examines and manipulates internal program properties of the object parsing program engine.

7. The server system of claim 6, when the at least one user role parameter is not authorized to make the attribute changes, the instructions are to return a list of attribute changes in a string format.

8. The server system of claim 6, when the at least one user role parameter is not authorized to make the attribute changes, the instructions are to return a list of attribute changes in a map format.

9. The server system of claim 6, wherein the attribute changes are to a subset of attributes of the original annotated software component defined by the at least one annotation construct.

10. The server system of claim 6, wherein the at least one annotation construct defines attributes that cannot be modified.

11. The server system of claim 6, wherein the instructions reject the attribute changes of the original annotated software when the at least one annotation construct does not list the attributes.

12. The server system of claim 6, wherein the instructions pass the at least one user role parameter as a user-defined variable within the software object update system.

13. A computer implemented method of updating annotated software objects, the method comprising:
constructing electronically an original annotated software object within a software object update system comprising an object parsing program engine and an object updating program engine;
executing the object parsing program engine that electronically parses for a specific software code in the original annotated software object associated with at least one annotation construct, wherein each of the at least one annotation construct is to define which attributes of the original annotated software object can be modified and at least one user role parameter comprising a no override parameter designation authorized to implement modifications of the original annotated software object;
executing the object updating program engine that electronically parses an updated annotated software object, which is an update of the original annotated software object, based on the at least one annotation construct involving:
a) attribute changes to the original annotated software object; and
b) the at least one user role parameter associated with the attribute changes;
responsive to the at least one user role parameter being authorized to make the attribute changes, accepting the attribute changes to the original annotated software object to store the attribute changes in the updated annotated software object; and
responsive to the at least one user role parameter not being authorized to make the attribute changes, rejecting the attribute changes to the original annotated software object to disallow storage of the attribute changes by the updated annotated software object; and
executing a software language introspection program as part of the object parsing program engine that self-examines and manipulates internal program properties of the object parsing program engine.

14. The computer implemented method of claim 13, when the at least one user role parameter is not authorized to make the attribute changes, returning a list of attribute changes in a string format and a list of attribute changes in map format.

15. The computer implemented method of claim 13, wherein the attribute changes are to attributes that are not designated by the at least one annotation construct.

* * * * *